Figure 1:
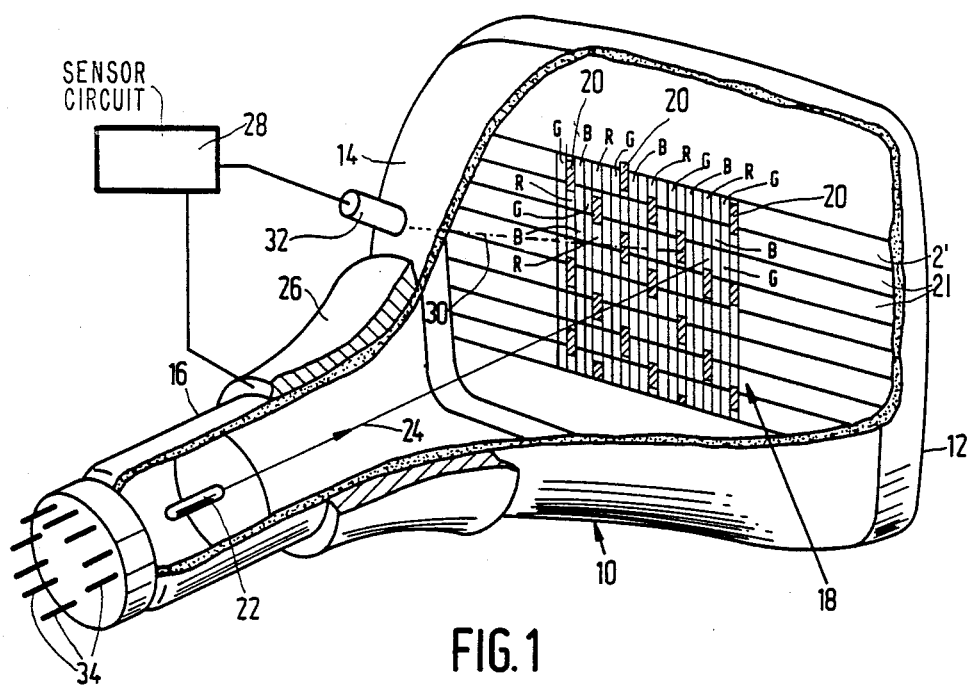

United States Patent [19]
Barten

[11] Patent Number: 4,894,711
[45] Date of Patent: Jan. 16, 1990

[54] BEAM INDEX DISPLAY TUBE AND DISPLAY SYSTEM INCLUDING THE BEAM INDEX DISPLAY TUBE

[75] Inventor: Piet G. J. Barten, Eindhoven, Netherlands

[73] Assignee: U.S. Philips Corporation, New York, N.Y.

[21] Appl. No.: 255,930

[22] Filed: Oct. 11, 1988

[30] Foreign Application Priority Data

Oct. 16, 1987 [GB] United Kingdom ............... 8724320

[51] Int. Cl.⁴ ............................................. H04N 9/24
[52] U.S. Cl. ....................................................... 358/68
[58] Field of Search ................... 313/400; 358/67, 68, 358/69; 315/10

[56] References Cited

U.S. PATENT DOCUMENTS 2,685,047 7/1954 Moore .................................. 358/68
3,443,139 5/1969 Thompson ........................... 358/69
3,732,359 5/1973 Chen .................................... 358/68

Primary Examiner—Theodore M. Blum
Attorney, Agent, or Firm—Robert J. Kraus

[57] ABSTRACT

A beam index display tube which has a screen structure enabling a circular spot to be used and has vertical beam indexing.

The screen (18) comprises a plurality of transversely extending, substantially contiguous lines (36 to 46), each line being composed of a plurality of triplets of different color emitting elements (R, G, B) and index elements (20) distributed along each line in accordance with a predetermined pattern. The phosphor elements in each triplet are spatially separated from each other, the intervening spaces being left empty, being occupied by an index element or being filled with a black matrix material. Additionally by staggering the triplets between adjacent lines then considered in a direction transverse to that of the spot scanning, no phosphor element is adjacent another phosphor element.

Vertical indexing is made possible by the index elements (20) being offset heightwise relative to the direction of scanning. Alternate elements (20) are offset in alternate directions so that it is possible to determine if the scanning electron beam is too high or too low because additional indexing signals are generated.

17 Claims, 5 Drawing Sheets

BEAM INDEX DISPLAY TUBE AND DISPLAY SYSTEM INCLUDING THE BEAM INDEX DISPLAY TUBE

The present invention relates to a beam index display tube and to a display system including such a beam index display tube.

Beam index display tubes offer a number of advantages compared to the widely used shadow mask display tubes. These are efficient electron utilization due to the absence of a shadow mask; no convergence errors, no grey-scale tracking difficulties; the tube is less susceptible to magnetic interference and black and white pictures can be reproduced faultlessly. However colour selection is done with an electron beam generally narrower than one phosphor area and in consequence it is necessary for there to be time synchronisation between the electron spot and the colour information. Also line synchronisation is necessary.

British Patent Specification No. 716889 discloses a beam index cathode ray tube and a line scanning circuit which is able to apply height control to a scanning electron beam so that the beam can pass correctly along a pre-designated horizontally extending phosphor line. Essentially this known proposal stems from the fact that frame scanning is not quite linear with time so that the pattern traced by the beam fails to coincide with the pattern of horizontal fluorescent lines provided on the screen. The horizontal phosphor lines are arranged in vertical triplets. In order to be able to apply height control to the electron beam, this prior specification discloses providing a comb shaped electrode along the vertical edge of the screen at which line scanning commences. Substantially equal length teeth of the comb shaped electrode extend between successive triplets for part of their extent. At the commencement of the scan of each triplet, a line-scanning circuit is activated and depending on the amplitude of the derived index signal then appropriate height adjustment is effected to the scanning beam by way of correction signals applied to the deflection coils or an additional coil. The amplitude of the index signal is large if it passes along a tooth of the comb shaped electrode, small if it completely misses a tooth and passes across the part of the electrode bridging adjacent teeth and somewhere between these values if partial overlap of a tooth occurs. This prior specification also discloses a more refined arrangement in which frame sequential scanning can be effected.

Another known proposal for a beam index cathode ray tube is disclosed in British Patent Specification No. 806510. Several different embodiments are disclosed of single and triple beam colour cathode ray tubes and in the interests of brevity it is not intended to enumerate each one here. The Patentees of Specification No. 806510 are concerned with (1) correlating the impingement of the spot on the screen with the colour information supplied to the electron gun(s) and (2) not using a secondary emitting material to produce an index signal. The screen comprises horizontally or vertically extending triplets of different colour emitting phosphor stripes. Index strips, comprising a material of which the specific conductivity varies upon electron impingement sandwiched between front and rear electrodes, are disposed either between the triplets or midway along the central strip of each triplet. In the case of a single electron beam cathode ray tube, height control can be applied in the case of horizontal triplets with the index strip extending midway along the centre phosphor strip by amplitude modulating (or wobbling) the electron beam spot in a sinusoidal manner and detecting the instants at which the beam spot crosses the index strip. If the time interval between successive index signals is the same then the beam is correctly adjusted heightwise. However if they are not equal then depending on the nature of the time intervals it can be determined if the electron beam spot is too high or too low. If the index strips lie between vertically arranged triplets, then an index signal can be derived as the electron beam scans in the horizontal direction, which signal can be used for scan velocity modulation of the colour information supplied to the electron gun.

Other proposals for obtaining (1) ultra-violet index signals; (2) pairs of index signals, one from each side of the cathodoluminescent screen; and (3) improving the amplitude of light emitting index signals from the edge regions of a screen are disclosed in U.S. Patent Specification Nos. 3154715 and 3767954.

Although the beam index tube does not have the disadvantage of loss of brightness due to the presence of a shadow mask, a factor which does limit the brightness is the size of the spot. As a general rule to ensure good colour purity, the spot is vertically elongate having a width not exceeding one sixth of the triplet. Thus taking as an example a 26" display tube in which the triplet pitch is 800 $\mu$m, then the spot width is of the order of 800/6=133 $\mu$m. In the vertical direction the height of the spot is limited by resolution and the height should not be larger than the vertical line distance or spacing which for a 26" tube is 700 $\mu$m. At maximum brightness the spot is a symmetrical and subject to spot rotation during deflection.

An object of the present invention is to provide a beam index tube which enables tracking of the electron spot to be monitored substantially continuously.

According to one aspect of the present invention there is provided a beam index display tube comprising an envelope in which there is provided an electron gun and a cathodoluminescent screen, the cathodoluminescent screen being composed of a plurality of transversely extending substantially contiguous lines, each line being constituted by a plurality of triplets of different colour emitting elements and index elements spatially positioned between at least one pair of colour emitting elements of at least some of the triplets, index elements in each line being offset heightwise in opposite directions to overlap partially their adjacent lines, and means for detecting index signals produced in response to scanning the index elements by an electron beam produced by the electron gun.

If desired successive index elements in each line may be offset heightwise in opposite directions.

Offsetting the index elements heightwise relative to each other and to the scanning beam path enables the horizontal tracking to be monitored continuously whilst enabling vertical indexing to be realised. Height correction is important otherwise the electron beam will tend oscillate between the lines causing incorrect modulation and synchronisation of the electron beam.

By arranging for index elements to be present in say each of two out of every three successive triplets or having 3 index elements in every two triplets then a better indication of the relative horizontal position of the electron beam is provided. Locating the index element in the same relative position in those triplets in which index elements are present ensures that the position of the index signal is known. In those cases where the index elements are radiation emissive then by omitting index elements reduces the regularity of the pattern of afterglow and renders index signals more readily identifiable.

If desired the colour emitting elements constituting a line may be non-contiguous heightwise with the colour emitting elements constituting an adjoining line. In embodiments of the present invention the colour emitting elements constituting a line are offset by half a triplet pitch with respect to the corresponding colour emitting elements constituting an adjoining line.

By the screen comprising staggered triplets, rather than vertical stripes, having spaces or black matrix material between adjacent phosphor elements then the width of the spot can be greater and more symmetrical for example circular or substantially circular. More particularly the staggered triplets can have a width of 1.4 mm at a triplet height of 0.7 mm. The triplet may be composed of phosphor elements of 300 $\mu$m width with black interspaces of 170 $\mu$m. Thus a spot having a width of approximately 500 $\mu$m and a height of 700 $\mu$m is then possible. Experience has shown that such a spot size can be achieved fairly easily for beam currents of the order of 2 mA. At such a peak value of the beam current, the d.c. value is of the order of $1/5 \times 2.0 = 0.4$ mA, ignoring the switching losses. Since the phosphor elements of the triplets are narrower than the width of the spot then then the d.c. value of the beam current landing on the phosphor element is $300/500 \times 0.4 = 0.24$ mA. By way of comparison, in a shadow mask tube the d.c. value of the beam current of the 3 electron guns is of the order of 1.2 mA at a maximum. Assuming a transmission of the mask of the order of 20% (centre) then $0.2 \times 1.2$ mA$=0.24$ mA lands on the triplets of phosphors. In spite of the fact that these two exemplary values are the same the beam current in the beam index tube has the possibility of being increased to provide a brighter picture, whereas a corresponding increase in the beam current of a shadow mask tube will not produce the same increase in brightness because a greater proportion of the electrons will be intercepted by the shadow mask.

As the spot may be round or substantially round then it is possible to use an anastigmatic deflection coil as used in monochrome datagraphic display tubes instead of an in-line deflection coil. Also spot rotation is not a problem with circular electron beams. Further deflection defocusing can be minimised by using dynamic focusing.

It is necessary to index the vertical position of the electron beam because the triplets comprise phosphor elements rather than vertical stripes.

According to another aspect of the present invention there is provided a beam index display system comprising a beam index display tube made in accordance with the present invention, means for scanning an electron beam produced by the electron gun over the screen, and circuit means coupled to the index signal detecting means and to the scanning means for producing beam height correcting signals in response to the detected index signals and for supplying for correcting signals to the scanning means for adjusting the vertical height of the electron beam relative to the centre of a line being scanned.

Figure 2:
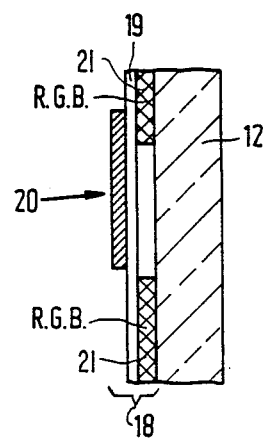
Figures 3, 4A, 4B, 4C, 4D, 4E, 4F, 4G, 4H:
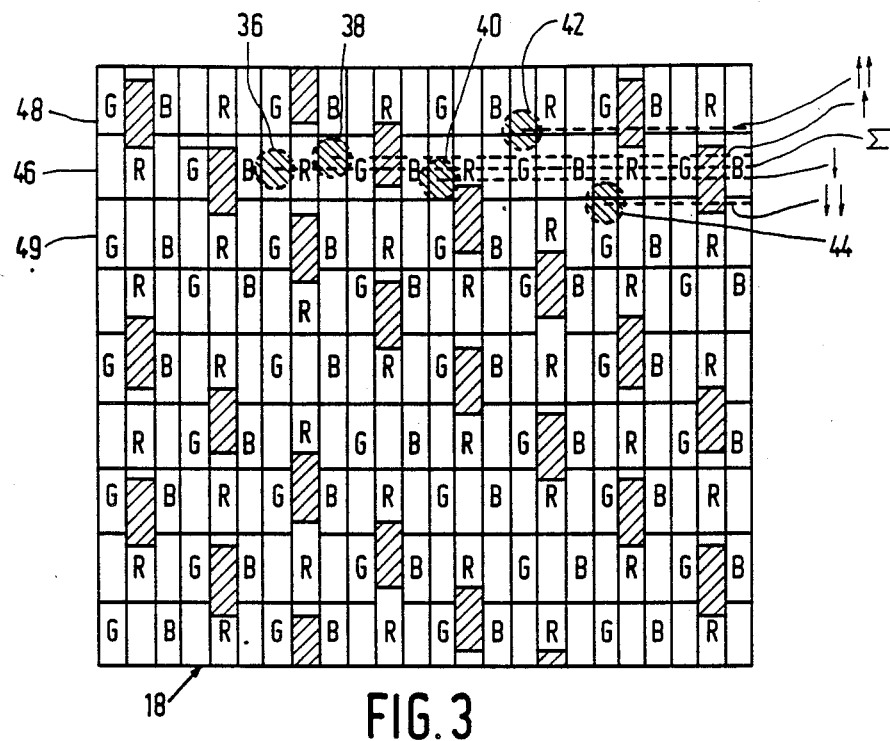
Figure 5:
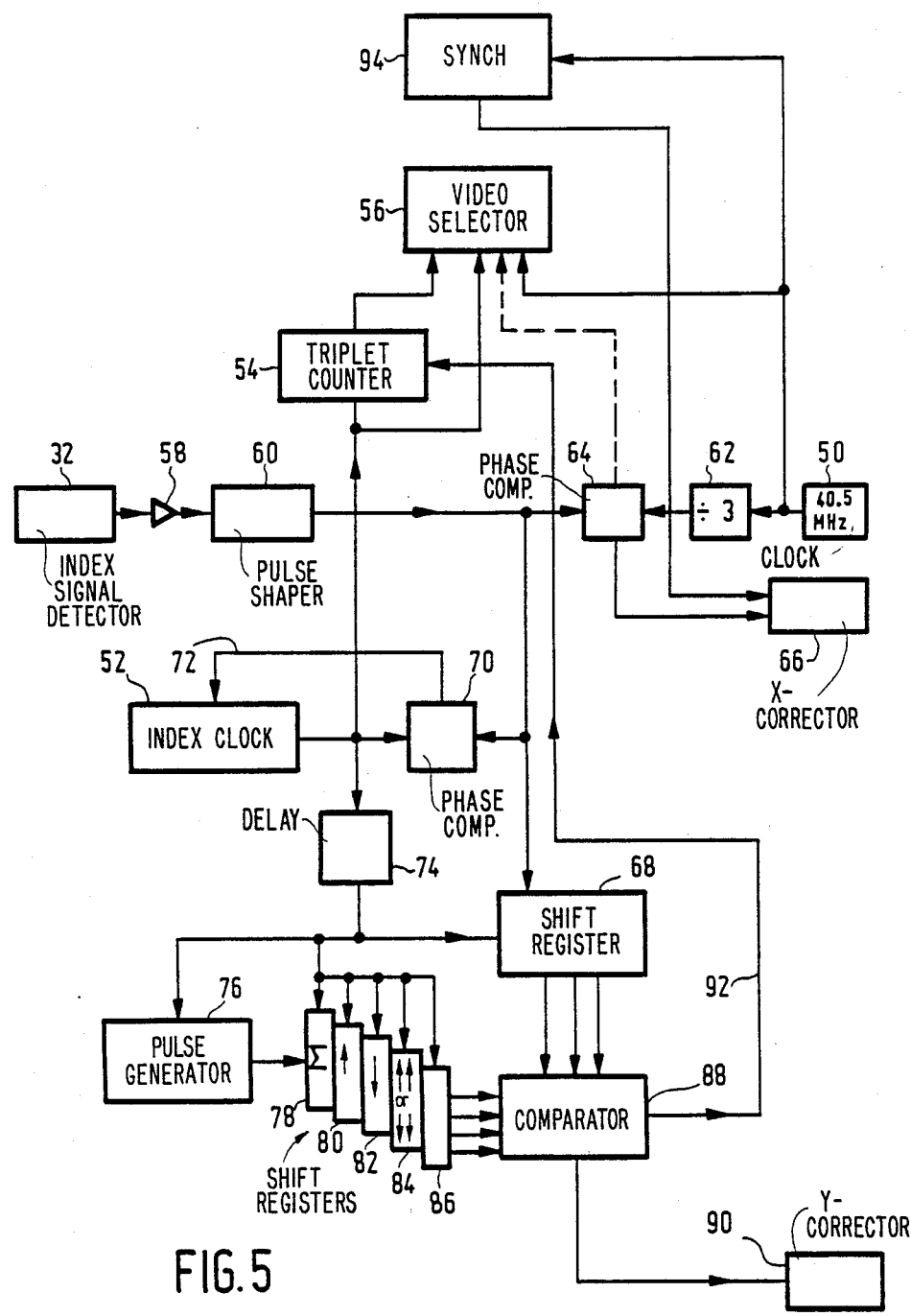
Figure 6:
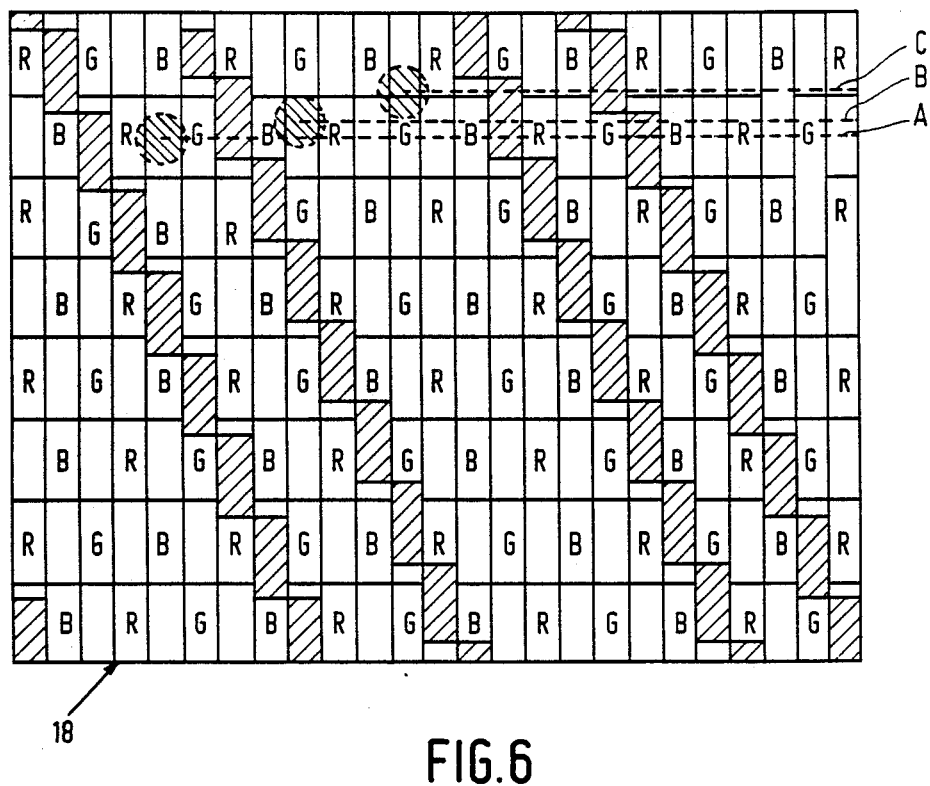
Figures 7, 8:
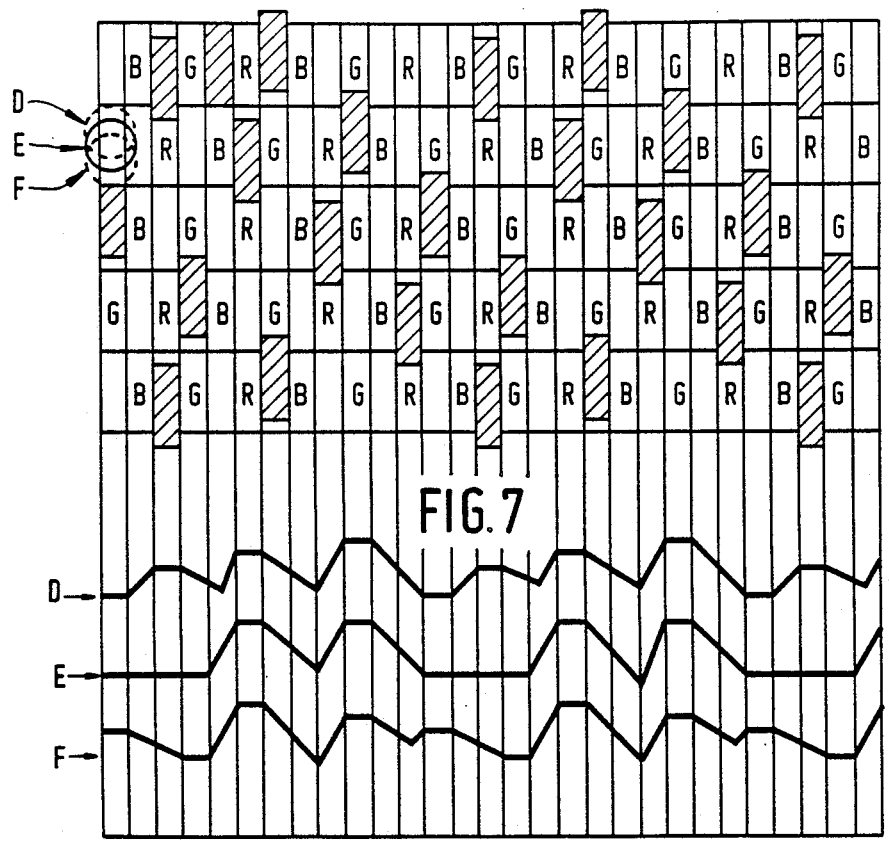

The present invention will now be described, by way of example, with reference to the accompanying drawings, wherein:

FIG. 1 is a perspective view, partly broken away, of a beam index display tube system made in accordance with the present invention, FIG. 2 is a vertical cross-sectional view through a portion of the faceplate and the screen, FIG. 3 shows part of a cathodoluminescent screen in which there is a 3:2 relationship between the triplets of phosphor elements and index elements, FIGS. 4A to 4H show different signals derived in operating the beam index display tube shown in FIG. 3, FIG. 5 is a block schematic diagram of the circuitry for processing the index signals derived from the screen shown in FIG. 3 and FIG. 6 shows another screen structure in which there are three index elements to every two triplets of phosphor elements.

In the drawings corresponding reference numerals have been used to indicate the same features.

The beam index display tube shown in FIGS. 1 and 2 comprises an envelope 10 formed by a faceplate 12, a cone 14 and a neck 16. On the inside of the faceplate 12 is provided a cathodoluminescent screen 18 comprising a plurality of transversely extending lines, for example 625 lines formed by phosphor elements. The phosphor elements are arranged in triplets luminescing in red (R), green (G) and blue (B). The triplets are backed by an electron permeable aluminum layer 19. Fast decaying light emitting index elements 20, for example for ultraviolet emitting material, are also provided in accordance with a predetermined pattern and geometrical arrangement on the aluminium layer 19. One example of an arrangement of phosphor and index elements wil be described later with respect to FIG. 3.

In the neck 16 of the tube is provided a single beam electron gun 22 which produces an electron beam 24 having a substantially circular cross section at the screen. The beam 24 is scanned across the screen 18 by means of a deflection coil system 26. In addition to the normal line and frame scanning coils, the system 26 includes a scan velocity modulation coil which modifies the rate of line scanning in response to control signals provided by a control circuit 28.

Index signals 30 produced by the index elements 20 in response to electron beam impingement are detected by a sensor 32 disposed in the neck 16. For ease of representation the sensor 32 is shown directly connected to the circuit 28 whereas in reality electrical connections to the electron gun 22 and the sensor 32 are by way of pins 34 sealed in the end of the neck 16. The sensor 32 may comprise a semiconductor photo-electric sensor if the index signals are of a suitable amplitude for such sensors. Alternatively if the index signals have an amplitude which is too low for detection by semi-conductor sensors then the detector may comprise a photomultiplier tube optically coupled to the external surface of the cone.

FIG. 3 shows a portion of the screen 18. As already mentioned, the screen 18 comprises row of triplets of phosphor elements R, G, B. The height of each element is substantially equal to the height of a raster line. A space equivalent to the width of a phosphor element, hereinafter termed an elemental space, is provided between adjacent phosphor elements and aligned with certain of these elemental spaces the index stripes 20 are provided on the aluminium layer (not shown) in accordance with a predetermined pattern. The remaining elemental spaces may be left empty or filled with a black light absorbing material.

The screen is produced by photographic techniques, known per se. The triplets of phosphor elements forming adjacent horizontally extending lines are offset or staggered with respect to each other so that corresponding colour emitting phosphor elements in adjacent lines are displaced by half the pitch of a triplet. However the phosphor elements in alternate lines are aligned vertically so that as far as interlaced scanning is concerned each field effectively comprises continuous vertical stripes. However by offsetting or staggering the phosphor elements in adjacent rows then an improved colour resolution for the same video modulation rate is obtained. In particular a relatively large circular beam spot can be used, which spot has a diameter greater than the width of a phosphor element, without causing colour distortion because the adjoining elemental spaces do not comprise phosphor elements.

In FIG. 3 the arrangement and disposition of the index elements 20 are such that there are index elements between, or in corresponding positions in, two successive triplets out of every three. There is an offset of half the pitch of a triplet between the index elements 20 of one line and the adjacent line(s). Also the index elements are displaced heightwise so that alternate index elements in a line partially overlap the line above and the intervening index elements partially overlap the line below. With such an arrangement of index elements it is possible to obtain vertical indexing and thereby the possibility to adjust, if required, the path of the spot produced by the electron beam as it is scanned along a line. This avoids the possible problem of the spot oscillating between adjacent lines leading to incorrect modulation of the electron beam.

FIG. 3 also illustrates by way of example an electron beam spot which has a central trajectory, line 36; a trajectory which is slightly too high, line 38, or slightly too low, line 40, and a trajectory which is much too high, line 42, or much too low, line 44.

The manner and means by which these adjustments and corrections are realised will be described with reference to FIGS. 3, 4A to 4H and 5 of the accompanying drawings. It will be assumed that a line is being scanned. FIG. 4A represents a 40.5 MHz master clock signal produced by a master clock 50 (FIG. 5). FIG. 5B represents a nominal 13.5 MHz index clock signal produced by an index clock signal generator 52 (FIG. 5), the precise output of which is adjusted by the scan velocity which is a function of the index signals produced. FIG. 4C shows the output of a triplet counter 54 (FIG. 5) which has an output connected to a video selector 56 (FIG. 5). FIG. 4D shows the index signal, designated $\Sigma$, for a spot being scanned centrally along a line having index elements arranged as shown in the line 46. FIGS. 4E and 4F respectively show the index signals for a spot which is slightly too high or too low with respect to the centre of the line 46, as represented by the single arrows in the right hand margin of FIGS. 4E and 4F. 4G and 4H respectively show the index signals for a spot which is much too high or much too low with respect to the centre of the line 46, as represented by double arrows in the right hand margin of these figures.

Before discussing the signal processing, FIGS. 4D to 4H will be described in greater detail. In FIG. 4D as the spot passes centrally along the line 46 (FIG. 3) index signals are produced having their leading edges in time slots T5, T11 and T23 corresponding to the index elements in that line. Now if the spot is slightly too high (FIG. 4E) it will impinge upon not only the index elements in the line 46 but also those index elements in the line 44 which overlap the top of the line 46 so that additional signals are produced in the time slots T2 and T20. Conversely if the spot is slightly too low (FIG. 4F), it will impinge upon not only the index elements in the line 46 but also those index elements in the line 48 which overlap the bottom edge of the line 46 so that an additional signal is produced in the time slot T14. A comparison of FIGS. 4E and 4F shows that the occurrence and positions of the additional signals distinguishes a signal representing a spot which is slightly too high from a signal representing a spot which is slightly too low. If the spot should be displaced much too high then it will impinge not only on the index elements in the line 46 and those elements in the line 44 which overlap the line 46 but also the other index elements in the line 44 which are displaced upwards and overlap the line 42 above. Thus compared to FIG. 4E an additional signal occurs in the time slot T8. In the converse situation shown in FIG. 4H, compared to FIG. 4F, an additional signal occurs in the time slot T8. Thus the number and relative disposition of the pulses in the respective signals provides an indication of a spot relative to the line being scanned. The fact the index signals overlap their immediately following time slot due to the effect of the persistence of the index ultra violet light is of no consequence because index signal detection is based on detecting the leading edge.

The circuit shown in FIG. 5 comprises the index signal detector 32 which produces an electrical signal which is amplified in an amplifier 58. The amplified signal is applied to the block 60 in which it is differentiated and the differentiated signals are compared against a reference level. Those differentiated signals which exceed the reference level are shaped in a pulse shaper also included in the block 60. Thus noise signals and weak signals due to stray radiation are eliminated.

In the case of modulating the scan speed so that it is in synchronism with video selector, an operation which may be termed the "X-correction", the 40.5 MHz master clock oscillator 50 has its output frequency divided by three in a frequency divider 62. The signal output from the divider 62 is applied to a phase comparator 64 in which the phase of the pulses from the pulse shaper in the block 60 is compared with the frequency divided reference signal. The phase difference between the leading edges of these signals is used to form an "error" or "correction" signal in an X-corrector 66 which has an output connected to the scan velocity modulation coil. Optionally, and as indicated in broken lines, the "error" signal may be used to adjust the video selector 56.

In the case of correcting the position of the spot heightwise, that is, the "Y-correction", the pulses from the block 60 are stored in a shift register 68 so as to constitute a recent history of the index signals. These pulses are also supplied to another phase comparator 70 in which they are compared with the clock signals produced by index clock signal generator 52. The "error" signal produced by the phase comparator 70 on a line 72 is used to adjust the frequency of the signal generator 52. The output from the signal generator 52 is applied to the triplet counter 54, the video selector 56 and to a delay circuit 74 having a time delay of the order of some nanoseconds. Such a short time delay is introduced to compensate for signal processing delays elsewhere in the circuit. The output of the delay circuit 74 is supplied to the shift register 68 as a shift clock signal. It is also supplied to a pulse generator 76 constitutes by six flipflops. The output from the pulse generator is applied to a group of five shift registers 78 to 86 which store predetermined patterns of pulses corresponding to spot on-line (Σ), register 78; spot slightly too high, register 80; spot slightly too low, register 82; spot much too high or much too low, register 84; and phase, register 86. These registers 78 to 86 are coupled to a comparator 88 to which the output of the shift register 68 is connected. In the comparator 88, the pulse sequence relating to recent history is compared with the contents of the registers 78 to 86 and a decision is made as to whether a "Y-correction" is necessary and, if so, what is the extent of the correction. In consequence an appropriate signal is sent to a "Y-corrector" 90. If phase recognition is achieved in the comparator 88 then a signal is sent on a line 92 to a reset input of the triplet counter 54. The reason for doing this is to synchronise the video selector 56 to the beginning of each triplet by determining the instant of scanning a particular phosphor stripe, say the green stripe G.

FIG. 6 shows another embodiment of a screen 18 formed by a plurality of substantially horizontal lines constituted by triplets of R, G, B phosphors. The main difference between this screen and that shown in FIG. 3 is the number and disposition of the index elements 20. There are three index elements 20 to every two triplets and these are located in alternate spaces between the phosphor elements of the pairs of triplets. Successive index elements are offset heightwise in opposite directions so as to provide signals for height adjustment. Also in the screen 18 shown in FIG. 6 the index elements are displaced laterally by one elemented position proceding from line to line. For the sake of completeness the relative spot positions for online, slightly too high and much too high have been shown.

In processing the signals derived from the index elements using the circuitry shown in FIG. 5 the shift registers 78 to 86 store predetermined patterns of pulses appropriate to the arrangement of the index elements.

The present invention is applicable to other arrangements of index elements besides those disclosed with reference to FIGS. 3 and 6.

From reading the present disclosure, other modifications will be apparent to persons skilled in the art. Such modifications may involve other features which are already known in the design, manufacture and use of display systems and beam index display tubes and component parts thereof and which may be used instead of or in additional features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A beam index display tube comprising an envelope; and electron gun; and a cathodoluminescent screen, the cathodoluminescent screen comprising a plurality of transversely extending substantially contiguous lines, each line comprising a plurality of triplets of different colour emitting elements and index elements spatially positioned between at least one pair of color emitting elements of at least some of the triplets, selected index elements in each line being offset heightwise in opposite directions to partially overlap their adjacent lines; and means for detecting index signals produced in response to scanning the index elements by an electron beam produced by the electron gun.

2. A display tube as claimed in claim 1, wherein successive index elements in each line are offset heightwise in opposite directions.

3. A display tube as claimed in claim 1, wherein adjacent colour emitting elements in a triplet are separated from each other by a space having a width of the order of the width of a colour emitting element and wherein the major part of the height of each index element is aligned with its respective space.

4. A display tube as claimed in claim 1, wherein an index element is provided in each of two out of every three triplets.

5. A display tube as claimed in claim 4, wherein the index elements are located in the same relative positions within their respective triplets.

6. A display tube as claimed in claim 4, wherein the index elements in adjacent lines are displaced horizontally with respect to each other.

7. A display tube as claimed in claim 6, wherein the index elements in adjacent lines are offset by half a triplet pitch with respect to each other.

8. A display tube as claimed in claim 1, wherein three index elements are provided in every two triplets.

9. A display tube as claimed in claim 7, wherein the index elements in each line are evenly spaced apart.

10. A display tube as claimed in claim 7, wherein the index elements in adjacent lines are offset by one elemental position with respect to each other.

11. A display tube as claimed in claim 1 wherein the index elements comprise a material which emits non-visible radiation in response to electron beam impingement.

12. A display tube as claimed in any one of claims 1 to 11, wherein the colour emitting elements constituting a line are non-contiguous heightwise with the colour emitting elements constituting an adjoining line.

13. A display tube as claimed in any one of claims 1 to 11, wherein the colour emitting elements constituting a line are offset by half a triplet pitch with respect to the corresponding colour emitting elements constituting an adjoining line.

14. A beam index display system comprising a display tube having an envelope in which there is provided an electron gun and a cathodoluminescent screen, the cathodoluminescent screen comprising of a plurality of transversely extending substantially contiguous lines, each line comprising by a plurality of triplets of different color emitting elements and index elements spatially positioned between at least one pair of color emitting elements of at least some of the triplets, selected index elements in each line being offset heightwise in opposite directions partially to overlap their adjacent lines, and means for detecting index signals produced in response to scanning the index elements by an electron beam produced by the electron gun; means for scanning an electron beam produced by the electron gun over the screen, and circuit means coupled to the scanning means for producing beam height correcting signals in response to the detected index signals and for supplying the correcting signals to the scanning means for adjusting the vertical height of the electron beam relative to the center of a line being scanned.

15. A display system as claimed in claim 14, wherein the circuit means is able to determine, from the pattern of the index signals produced, the degree of misalignment of the scanning electron beam with reference to the centre of a line being scanned.

16. A display system as claimed in claim 14, wherein the scanning means comprises electro-magnetic deflection coils and a velocity modulation coil and wherein the circuit means includes a video selector and means for supplying a scan speed signal to the velocity modulation coil for synchronising the scanning electron beam with the video information from the video selector.

17. A display system as claimed in claim 14, 15 or 16, wherein the electron gun produces a substantially circular spot at the screen.

* * * * *